United States Patent
Blakeman et al.

(10) Patent No.: US 9,259,684 B2
(45) Date of Patent: Feb. 16, 2016

(54) EXHAUST SYSTEM FOR A LEAN-BURN INTERNAL COMBUSTION ENGINE INCLUDING SCR CATALYST

(71) Applicant: JOHNSON MATTHEY PUBLIC LIMITED COMPANY, London (GB)

(72) Inventors: Philip Gerald Blakeman, Philadelphia, PA (US); Gavin Michael Brown, Saffron Walden (GB); Andrew Francis Chiffey, Ware (GB); Jane Gast, Spring City, PA (US); Paul Richard Phillips, Royston (GB); Raj Rao Rajaram, Slough (GB); Glen Spreitzer, Collegeville, PA (US); Andrew Peter Walker, High Wycombe (GB)

(73) Assignee: Johnson Matthey Public Limited Company, London (GB)

( * ) Notice: Subject to any disclaimer, the term of this patent is extended or adjusted under 35 U.S.C. 154(b) by 189 days.

(21) Appl. No.: 13/711,138

(22) Filed: Dec. 11, 2012

(65) Prior Publication Data

US 2013/0149223 A1    Jun. 13, 2013

Related U.S. Application Data

(60) Provisional application No. 61/569,537, filed on Dec. 12, 2011.

(30) Foreign Application Priority Data

Jan. 18, 2012    (GB) .................................. 1200784.5

(51) Int. Cl.
| | | |
|---|---|---|
| *B01J 23/58* | (2006.01) | |
| *B01D 53/94* | (2006.01) | |
| *B01J 35/00* | (2006.01) | |
| *F01N 3/20* | (2006.01) | |
| *F01N 3/28* | (2006.01) | |
| *B01J 37/02* | (2006.01) | |
| *B01J 37/03* | (2006.01) | |
| *B01J 23/42* | (2006.01) | |
| *B01J 23/44* | (2006.01) | |
| *B01J 23/72* | (2006.01) | |
| *B01J 29/76* | (2006.01) | |
| *B01J 35/04* | (2006.01) | |
| *B01J 37/00* | (2006.01) | |
| *F01N 13/00* | (2010.01) | |
| *F01N 3/035* | (2006.01) | |
| *B01J 23/63* | (2006.01) | |
| *B01J 23/83* | (2006.01) | |
| *B01J 29/85* | (2006.01) | |

(52) U.S. Cl.
CPC ........ *B01D 53/9477* (2013.01); *B01D 53/9472* (2013.01); *B01J 23/42* (2013.01); *B01J 23/44* (2013.01); *B01J 23/72* (2013.01); *B01J 29/763* (2013.01); *B01J 29/7615* (2013.01); *B01J 35/0006* (2013.01); *B01J 35/04* (2013.01); *B01J 37/0036* (2013.01); *B01J 37/0215* (2013.01); *B01J 37/0246* (2013.01); *B01J 37/038* (2013.01); *F01N 3/2066* (2013.01); *F01N 3/2803* (2013.01); *F01N 13/009* (2014.06); *B01D 53/944* (2013.01); *B01D 53/9418* (2013.01); *B01D 2255/1021* (2013.01); *B01D 2255/1023* (2013.01); *B01D 2255/20761* (2013.01); *B01J 23/63* (2013.01); *B01J 23/83* (2013.01); *B01J 29/85* (2013.01); *B01J 2229/186* (2013.01); *F01N 3/035* (2013.01); *F01N 2370/00* (2013.01); *F01N 2510/0682* (2013.01); *F01N 2610/02* (2013.01); *Y02T 10/24* (2013.01)

(58) Field of Classification Search
CPC .......... B01D 53/9477; B01D 53/9472; B01D 2255/20761; B01D 53/944; B01D 2255/1023; B01D 53/9418; B01D 2255/1021; B01J 35/0006; B01J 37/0246; B01J 37/038; B01J 37/0215; B01J 37/0036; B01J 29/7615; B01J 23/44; B01J 35/04; B01J 29/763; B01J 23/42; B01J 23/72; B01J 23/63; B01J 29/85; B01J 23/83; F01N 13/009; F01N 3/2066; F01N 3/2803; F01N 2510/0682; F01N 2610/02; F01N 3/035; F01N 2370/00; Y02T 10/24

USPC .................... 502/325, 339, 439, 500, 527.12; 60/299; 423/213.5
See application file for complete search history.

(56) References Cited

U.S. PATENT DOCUMENTS

| | | | |
|---|---|---|---|
| 5,473,887 | A | 12/1995 | Takeshima et al. |
| 6,080,375 | A | 6/2000 | Mussmann et al. |
| 6,093,378 | A | 7/2000 | Deeba et al. |
| 6,328,779 | B1 * | 12/2001 | He et al. ............... 55/523 |
| 6,348,430 | B1 | 2/2002 | Lindner et al. |
| 6,835,689 | B1 | 12/2004 | He et al. |
| 7,220,692 | B2 * | 5/2007 | Marshall et al. ............ 502/60 |
| 7,550,124 | B2 | 6/2009 | Chen et al. |
| 7,758,834 | B2 | 7/2010 | Chen et al. |
| 8,252,258 | B2 | 8/2012 | Muller-Stach et al. |
| 8,318,632 | B2 | 11/2012 | Matsueda et al. |
| 8,415,269 | B2 | 4/2013 | Hao et al. |
| 2001/0053340 | A1 | 12/2001 | Noda et al. |
| 2004/0209769 | A1 | 10/2004 | Demel et al. |
| 2005/0031514 | A1 * | 2/2005 | Patchett et al. ......... 423/239.2 |
| 2006/0057046 | A1 | 3/2006 | Punke et al. |
| 2006/0213323 | A1 | 9/2006 | Yamada et al. |
| 2007/0157607 | A1 | 7/2007 | Pfefferle |
| 2008/0045405 | A1 | 2/2008 | Beutel et al. |
| 2008/0125308 | A1 | 5/2008 | Fujdala et al. |
| 2009/0196812 | A1 | 8/2009 | Bull et al. |
| 2009/0260349 | A1 | 10/2009 | Gandhi et al. |
| 2009/0285737 | A1 | 11/2009 | Bull et al. |
| 2010/0016150 | A1 | 1/2010 | Yabuzaki et al. |
| 2010/0166629 | A1 | 7/2010 | Deeba |
| 2010/0175372 | A1 | 7/2010 | Lambert et al. |
| 2010/0180581 | A1 | 7/2010 | Grubert et al. |
| 2010/0183490 | A1 | 7/2010 | Hoke et al. |
| 2010/0215557 | A1 | 8/2010 | Liu et al. |
| 2010/0221154 | A1 | 9/2010 | Lee et al. |
| 2010/0263357 | A1 | 10/2010 | Lindner et al. |
| 2010/0290964 | A1 | 11/2010 | Southward et al. |
| 2010/0296992 | A1 * | 11/2010 | Jiang et al. ............. 423/239.2 |
| 2011/0014099 | A1 | 1/2011 | Dornhaus et al. |
| 2011/0064632 | A1 | 3/2011 | Huang et al. |
| 2011/0064633 | A1 | 3/2011 | Huang et al. |
| 2011/0099975 | A1 | 5/2011 | Bailey et al. |
| 2011/0138777 | A1 | 6/2011 | Jen et al. |
| 2011/0143921 | A1 * | 6/2011 | Hao et al. ................. 502/74 |
| 2011/0173950 | A1 | 7/2011 | Wan et al. |
| 2011/0206584 | A1 | 8/2011 | Dobson et al. |
| 2011/0286900 | A1 | 11/2011 | Caudle et al. |
| 2012/0128558 | A1 | 5/2012 | Nunan et al. |
| 2013/0084222 | A1 | 4/2013 | Grubert et al. |
| 2013/0089481 | A1 | 4/2013 | Sumiya et al. |
| 2013/0149207 | A1 | 6/2013 | Castagnola et al. |
| 2013/0149221 | A1 | 6/2013 | Blakeman et al. |
| 2013/0149222 | A1 | 6/2013 | Blakeman et al. |
| 2013/0302214 | A1 | 11/2013 | Pfeifer et al. |

FOREIGN PATENT DOCUMENTS

| | | |
|---|---|---|
| EP | 0341832 A2 | 11/1989 |
| EP | 0622107 A2 | 11/1994 |
| EP | 0766993 A2 | 4/1997 |
| EP | 0830201 B1 | 1/2000 |
| EP | 1925362 A1 | 5/2008 |
| EP | 2520354 A1 | 11/2012 |
| EP | 2535102 A1 | 12/2012 |
| GB | 2375059 A1 | 11/2002 |
| GB | 2406803 | 4/2005 |
| JP | 62068544 | 3/1987 |
| JP | 4022707 | 1/1992 |
| JP | 09-271674 | 10/1997 |
| JP | 2006-272064 | 10/2006 |
| JP | 2007-229679 | 9/2007 |
| JP | 2008-279352 | 11/2008 |
| WO | 9947260 A1 | 9/1999 |
| WO | 00/59630 A1 | 10/2000 |
| WO | WO 03033118 A1 * | 4/2003 |
| WO | 2005016497 A1 | 2/2005 |
| WO | 2008132452 A2 | 11/2008 |
| WO | 2009093071 A1 | 7/2009 |
| WO | 2009/136206 A1 | 11/2009 |
| WO | 2010/075345 A2 | 7/2010 |
| WO | 2010/133309 A1 | 11/2010 |
| WO | 2011/082357 A2 | 7/2011 |
| WO | 2011080525 A1 | 7/2011 |
| WO | 2011092521 A1 | 8/2011 |
| WO | 2011/131324 A1 | 10/2011 |
| WO | 2012/133055 A1 | 10/2012 |
| WO | 2012/147376 A1 | 11/2012 |
| WO | 2012/156883 A1 | 11/2012 |
| WO | 2012/175948 A1 | 12/2012 |

OTHER PUBLICATIONS

Cavataio, G. et al., "Impact and Prevention of Ultra-Low Contamination of Platinum Group Metals on SCR Catalysts Due to DOC Design," 2009, SAE Technical Paper 2009-01-0627.

Jen, H-W. et al., "Detection, Origin and Effect of Ultra-Low Platinum Contamination on Diesel-SCR Catalysts," Powertrains, Fuels & Lubricants Meeting, Rosemont, Illinois, Oct. 6-9, 2008, SAE Technical Paper 2008-01-2488.

GB Search Report dated May 16, 2012 for corresponding Application No. GB1200784.5 filed Jan. 18, 2012.

PCT International Search Report dated Mar. 6, 2013 for corresponding International Application No. PCT/GB2012/053081 filed Dec. 11, 2012.

* cited by examiner

*Primary Examiner* — Colleen Dunn
*Assistant Examiner* — Haytham Soliman
(74) *Attorney, Agent, or Firm* — Gary D. Mangels (57) ABSTRACT

An exhaust system 20 for an internal combustion engine comprises a) a first catalysed substrate monolith 12 comprising a first washcoat coating disposed in a first washcoat zone 16 of the substrate monolith and a second washcoat coating disposed in a second washcoat zone 18 of the substrate monolith, wherein the first washcoat coating comprises a catalyst composition comprising at least one platinum group metal (PGM) and at least one support material, wherein at least one PGM in the first washcoat coating is liable to volatilise when the first washcoat coating is exposed to relatively extreme conditions including relatively high temperatures, wherein the second washcoat coating comprises at least one material supporting copper for trapping volatilised PGM and wherein the second washcoat coating is oriented to contact exhaust gas that has contacted the first washcoat; and b) a second catalysed substrate monolith 14 comprising a catalyst for selectively catalysing the reduction of oxides of nitrogen to dinitrogen with a nitrogenous reductant disposed downstream from the first catalysed substrate monolith.

45 Claims, 5 Drawing Sheets

FIG. 5

EXHAUST SYSTEM FOR A LEAN-BURN INTERNAL COMBUSTION ENGINE INCLUDING SCR CATALYST

CROSS REFERENCE TO RELATED APPLICATIONS

This application claims priority benefit to U.S. Provisional Patent Application No. 61/569,537 filed on Dec. 12, 2011, and Great Britain Patent Application No. 1200784.5 filed on Jan. 18, 2012, both of which are incorporated herein by reference.

FIELD OF THE INVENTION

The present invention relates to an exhaust system for an internal combustion engine comprising a platinum-containing catalyst in a first washcoat coating disposed on a substrate monolith, which platinum-containing catalyst is liable to volatilise in high temperatures disposed upstream of a catalyst for selectively catalysing the reduction of oxides of nitrogen to dinitrogen with a nitrogenous reductant, i.e. a SCR catalyst.

BACKGROUND TO THE INVENTION

Generally, there are four classes of pollutant that are legislated against by inter-governmental organisations throughout the world: carbon monoxide (CO), unburned hydrocarbons (HC), oxides of nitrogen ($NO_x$) and particulate matter (PM).

As emissions standards for permissible emission of such pollutants in exhaust gases from vehicular engines become progressively tightened, a combination of engine management and multiple catalyst exhaust gas aftertreatment systems are being proposed and developed to meet these emission standards. For exhaust systems containing a particulate filter, it is common for engine management to be used periodically (e.g. every 500 km) to increase the temperature in the filter in order to combust substantially all remaining soot held on the filter thereby to return the system to a base-line level. These engine managed soot combustion events are often called "filter regeneration". While a primary focus of filter regeneration is to combust soot held on the filter, an unintended consequence is that one or more catalyst coatings present in the exhaust system, e.g. a filter coating on the filter itself (a so-called catalysed soot filter (CSF)) an oxidation catalyst (such as a diesel oxidation catalyst (DOC)) or a $NO_x$ adsorber catalyst (NAC) located upstream or downstream of the filter (e.g. a first DOC followed by a diesel particulate filter, followed in turn by a second DOC and finally a SCR catalyst) can be regularly exposed to high exhaust gas temperatures, depending on the level of engine management control in the system. Such conditions may also be experienced with unintended occasional engine upset modes or uncontrolled or poorly controlled regeneration events. However, some diesel engines, particularly heavy duty diesel engines operating at high load, may even expose catalysts to significant temperatures, e.g. >600° C. under normal operating conditions.

As vehicle manufacturers develop their engines and engine management systems for meeting the emission standards, the Applicant/Assignee is being asked by the vehicle manufacturers to propose catalytic components and combinations of catalytic components to assist in the goal of meeting the emission standards. Such components include DOCs for oxidising CO, HCs and optionally NO also; CSFs for oxidising CO, HCs, optionally for oxidising NO also, and for trapping particulate matter for subsequent combustion; NACs for oxidising CO and HC and for oxidising nitrogen monoxide (NO) and absorbing it from a lean exhaust gas and to desorb adsorbed NO and for reducing it to $N_2$ in a rich exhaust gas (see below); and selective catalytic reduction (SCR) catalysts for reducing $NO_x$ to $N_2$ in the presence of a nitrogenous reductant, such as ammonia (see below).

In practice, catalyst compositions employed in DOCs and CSFs are quite similar. Generally, however, a principle difference between the use of a DOC and a CSF is the substrate monolith onto which the catalyst composition is coated: in the case of a DOC, the substrate monolith is typically a flow-through substrate monolith, comprising a metal or ceramic honeycomb monolith having an array of elongate channels extending therethrough, which channels are open at both ends; a CSF substrate monolith is a filtering monolith such as a wall-flow filter, e.g. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternately separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Quite complicated multiple layered catalyst arrangements such as DOCs and NACs can be coated on a flow-through substrate monolith. Although it is possible to coat a surface of a filter monolith, e.g. an inlet channel surface of a wall-flow filter, with more than one layer of catalyst composition, an issue with coating filtering monoliths is to avoid unnecessarily increasing back-pressure, when in use, by overloading the filter monolith with catalyst washcoat, thereby restricting the passage of gas therethrough. Hence, although coating a surface of a filter substrate monolith sequentially with one or more different catalyst layers is not impossible, it is more common for different catalyst compositions to be segregated either in zones, e.g. axially segregated front and rear half zones of a filter monolith, or else by coating an inlet channel of a wall-flow filter substrate monolith with a first catalyst composition and an outlet channel thereof with a second catalyst composition. However, in particular embodiments of the present invention, the filter inlet is coated with one or more layers, which layers may be the same or a different catalyst composition. It has also been proposed to coat a NAC composition on a filtering substrate monolith (see e.g. EP 0766993).

In exhaust systems comprising multiple catalyst components, each comprising a separate substrate monolith, typically, the SCR catalyst is located downstream of a DOC and/or a CSF and/or a NAC because it is known that by oxidising some nitrogen oxide (NO) in the exhaust gas to nitrogen dioxide ($NO_2$) so that there is about a 1:1 ratio of NO:$NO_2$ exiting the DOC and/or the CSF and/or the NAC, the downstream SCR reaction is promoted (see below). It is also well known from EP341832 (the so-called Continuously Regenerating Trap or CRT®) that $NO_2$, generated by oxidising NO in exhaust gas to $NO_2$, can be used to combust soot passively on a downstream filter. In exhaust system arrangements where the process of EP341832 is important, were the SCR catalyst to be located upstream of the filter, this would reduce or prevent the process of combusting trapped soot in $NO_2$, because a majority of the $NO_x$ used for combusting the soot would likely be removed on the SCR catalyst.

However, a preferred system arrangement for light-duty diesel vehicles is a diesel oxidation catalyst (DOC) followed by a nitrogenous injector, then a SCR catalyst and finally a catalysed soot filter (CSF). A short hand for such an arrangement is "DOC/SCR/CSF". This arrangement is preferred for light-duty diesel vehicles because an important consideration is to achieve $NO_x$ conversion in an exhaust system as quickly as is possible after a vehicle engine is started to enable (i) precursors of nitrogenous reductants such as ammonia to be injected/decomposed in order to liberate ammonia for $NO_x$ conversion; and (ii) as high $NO_x$ conversion as possible. Were a large thermal mass filter to be placed upstream of the SCR catalyst, i.e. between the DOC and the SCR catalyst ("DOC/CSF/SCR"), (i) and (ii) would take far longer to achieve and $NO_x$ conversion as a whole of the emission standard drive cycle could be reduced. Particulate removal can be done using oxygen and occasional forced regeneration of the filter using engine management techniques.

It has also been proposed to coat a SCR catalyst washcoat on a filter substrate monolith itself (see e.g. WO 2005/016497), in which case an oxidation catalyst may be located upstream of the SCR-coated filter substrate (whether the oxidation catalyst is a component of a DOC, a CSF or a NAC) in order to modify the $NO/NO_2$ ratio for promoting $NO_x$ reduction activity on the SCR catalyst. There have also been proposals to locate a NAC upstream of a SCR catalyst disposed on a flow-through substrate monolith, which NAC can generate $NH_3$ in situ during regeneration of the NAC (see below). One such proposal is disclosed in GB 2375059.

NACs are known e.g. from U.S. Pat. No. 5,473,887 and are designed to adsorb $NO_x$ from lean exhaust gas (lambda >1) and to desorb the $NO_x$ when the oxygen concentration in the exhaust gas is decreased. Desorbed $NO_x$ may be reduced to $N_2$ with a suitable reductant, e.g. engine fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda =1 composition), stoichiometric or rich of stoichiometric (lambda <1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, (i.e. substantially more than is required for use as a promoter such as a promoter in a three-way catalyst), of a $NO_x$-storage component, such as barium, and a reduction catalyst, e.g. rhodium. One mechanism commonly given for $NO_x$-storage from a lean exhaust gas for this formulation is:

(1);

and

(2), wherein in reaction (1), the nitric oxide reacts with oxygen on active oxidation sites on the platinum to form $NO_2$. Reaction (2) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (3) below. In the presence of a suitable reductant, these nitrogen oxides are subsequently reduced by carbon monoxide, hydrogen and hydrocarbons to $N_2$, which can take place over the reduction catalyst (see reaction (4)).

(3);

and (4);

(Other reactions include $Ba(NO_3)_2+8H_2 \rightarrow BaO+2NH_3+5H_2O$ followed by $NH_3+NO_x \rightarrow N_2+yH_2O$ or $2NH_3+2O_2+CO \rightarrow N_2+3H_2O+CO_2$ etc.).

In the reactions of (1)-(4) inclusive herein above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of CO to $CO_2$ and unburned HCs to $CO_2$ and $H_2O$. Typical oxidation catalysts include platinum and/or palladium on a high surface area support.

The application of SCR technology to treat NO emissions from vehicular internal combustion (IC) engines, particularly lean-burn IC engines, is well known. Examples of nitrogenous reductants that may be used in the SCR reaction include compounds such as nitrogen hydrides, e.g. ammonia ($NH_3$) or hydrazine, or an $NH_3$ precursor.

$NH_3$ precursors are one or more compounds from which $NH_3$ can be derived, e.g. by hydrolysis. Decomposition of the precursor to ammonia and other by-products can be by hydrothermal or catalytic hydrolysis. $NH_3$ precursors include urea ($CO(NH_2)_2$) as an aqueous solution or as a solid or ammonium carbamate ($NH_2COONH_4$). If the urea is used as an aqueous solution, a eutectic mixture, e.g. a 32.5% $NH_3$ (aq), is preferred. Additives can be included in the aqueous solutions to reduce the crystallisation temperature. Presently, urea is the preferred source of $NH_3$ for mobile applications because it is less toxic than $NH_3$, it is easy to transport and handle, is inexpensive and commonly available. Incomplete hydrolysis of urea can lead to increased PM emissions on tests for meeting the relevant emission test cycle because partially hydrolysed urea solids or droplets will be trapped by the filter paper used in the legislative test for PM and counted as PM mass. Furthermore, the release of certain products of incomplete urea hydrolysis, such as cyanuric acid, is environmentally undesirable. SCR has three main reactions (represented below in reactions (5)-(7) inclusive) which reduce $NO_x$ to elemental nitrogen.

(5)

(6)

(7)

A relevant undesirable, non-selective side-reaction is:

(8)

In practice, reaction (7) is relatively slow compared with reaction (5) and reaction (6) is quickest of all. For this reason, when skilled technologists design exhaust aftertreatment systems for vehicles, they often prefer to dispose an oxidation catalyst element (e.g. a DOC and/or a CSF and/or a NAC) upstream of an SCR catalyst.

When certain DOCs and/or NACs and/or CSFs become exposed to the high temperatures encountered e.g. during filter regeneration and/or an engine upset event and/or (in certain heavy-duty diesel applications) normal high temperature exhaust gas, it is possible given sufficient time at high temperature for low levels of platinum group metal components, particularly Pt, to volatilise from the DOC and/or the NAC and/or the CSF components and subsequently for the platinum group metal to become trapped on a downstream SCR catalyst. This can have a highly detrimental effect on the performance of the SCR catalyst, since the presence of Pt leads to a high activity for competing, non-selective ammonia oxidation such as in reaction (9) (which shows the complete oxidation of $NH_3$), thereby producing secondary emissions and/or unproductively consuming $NH_3$.

$$4NH_3 + 5O_2 \rightarrow 4NO + 6H_2O \qquad (9)$$

One vehicle manufacturer has reported the observation of this phenomenon in SAE paper 2009-01-0627, which is entitled "Impact and Prevention of Ultra-Low Contamination of Platinum Group Metals on SCR catalysts Due to DOC Design" and includes data comparing the NO conversion activity against temperature for a Fe/zeolite SCR catalyst located in series behind four suppliers' platinum group metal (PGM)-containing DOCs that were contacted with a flowing model exhaust gas at 850° C. for 16 hours. The results presented show that the NO conversion activity of a Fe/zeolite SCR catalyst disposed behind a 20Pt:Pd DOC at 70 gft$^{-3}$ total PGM was negatively altered at higher evaluation temperatures as compared to lower evaluation temperatures as a result of Pt contamination. Two 2Pt:Pd DOCs from different suppliers at 105 gft$^{-3}$ total PGM were also tested. In a first 2Pt:Pd DOC, the SCR catalyst activity was affected to a similar extent as the test on the 20Pt:Pd DOC, whereas for the second 2Pt:Pd DOC tested the SCR catalyst activity was contaminated to a lesser extent, although the second 2Pt:Pd DOC still showed reduced NO conversion activity compared with the blank control (no DOC, just a bare substrate). The authors concluded that the supplier of the second 2Pt:Pd DOC, which showed more moderate NO conversion degradation, was more successful in stabilising the 70 gft$^{-3}$ Pt present with the 35 gft$^{-3}$ Pd. A Pd-only DOC at 150 gft$^{-3}$ demonstrated no impact on the downstream SCR relative to the blank control. Earlier work from the authors of SAE 2009-01-0627 was published in SAE paper no. 2008-01-2488.

US 2011/0014099 teaches a catalytically active particulate filter useful for removing nitrogen oxides and particulates from exhaust gases of internal combustion engines operated predominantly under lean conditions. The particulate filter comprises a filter body, a platinum group metal oxidation catalyst active coating, and a copper compound located in a second coating.

SUMMARY OF THE INVENTION

Vehicle manufacturers have begun asking the Applicant for measures to solve the problem of volatilisation of relatively low levels PGMs from components upstream of SCR catalysts. It would be highly desirable to develop strategies to prevent this PGM movement onto a downstream SCR catalyst at high temperatures. The present inventors have developed a number of strategies for meeting this need.

The inventors have found that volatilisation of platinum from a PGM-containing catalyst comprising both platinum and palladium can occur under extreme temperature conditions when the weight ratio of Pt:Pd is greater than about 2:1. It is also believed that where the PGM consists of platinum, platinum volatilisation may also be observed. The present inventors have devised an exhaust system arrangement including PGM-containing catalyst composition for use in combination with a downstream SCR catalyst which avoids or reduces the problem of PGM, particularly Pt, migrating from an upstream relatively highly loaded Pt catalyst to a downstream SCR catalyst. According to a first aspect the invention provides an exhaust system for an internal combustion engine, which system comprising:

a) a first catalysed substrate monolith comprising a first washcoat coating disposed in a first washcoat zone of the substrate monolith and a second washcoat coating disposed in a second washcoat zone of the substrate monolith, wherein the first washcoat coating comprises a catalyst composition comprising at least one platinum group metal (PGM) and at least one support material, wherein at least one PGM in the first washcoat coating is liable to volatilise when the first washcoat coating is exposed to relatively extreme conditions including relatively high temperatures, wherein the second washcoat coating comprises at least one material supporting copper for trapping volatilised PGM and wherein the second washcoat coating is oriented to contact exhaust gas that has contacted the first washcoat; and b) a second catalysed substrate monolith comprising a catalyst for selectively catalysing the reduction of oxides of nitrogen to dinitrogen with a nitrogenous reductant disposed downstream from the first catalysed substrate monolith.

According to a further aspect, the invention provides an internal combustion engine, particularly for a vehicle, comprising an exhaust system according to the invention. The lean-burn internal combustion engine can be a positive ignition, e.g. a spark ignition, engine that typically run on gasoline fuel or blends of gasoline fuel and other components such as ethanol, but is preferably a compression ignition, e.g. a diesel-type engine. Lean-burn internal combustion engines include homogenous charge compression ignition (HCCI) engines, powered either by gasoline etc. fuel or diesel fuel.

According to a further aspect, the invention provides a vehicle comprising an exhaust system according to the invention. Typically, the vehicle further comprises an internal combustion engine.

According to a yet further aspect, the invention provides a method of reducing or preventing a selective catalytic reduction (SCR) catalyst in an exhaust system of a lean-burn internal combustion engine from becoming poisoned with platinum group metal (PGM) which may volatilise from a catalyst composition comprising at least one PGM supported on at least one support material and disposed on a substrate monolith upstream of the SCR catalyst when the catalyst composition comprising PGM is exposed to relatively extreme conditions including relatively high temperatures, which method comprising trapping volatilised PGM in a washcoat coating comprising at least one material supporting copper, which is disposed on the same substrate monolith as the catalyst composition comprising PGM.

The invention further relates to the use of a washcoat coating to reduce or prevent poisoning of a selective catalytic reduction (SCR) catalyst by a platinum group metal (PGM), typically in an exhaust system of a lean-burn internal combustion engine, wherein the washcoat coating comprises at least one material supporting copper, and the washcoat coating is disposed on a substrate monolith comprising at least one PGM, preferably supported on at least one support material.

A further aspect of the invention relates to the use of a catalysed substrate monolith to reduce or prevent poisoning of a selective catalytic reduction (SCR) catalyst by a platinum group metal (PGM), typically in an exhaust system of a lean-burn internal combustion engine, wherein the catalysed substrate monolith comprises a first washcoat coating disposed in a first washcoat zone of the substrate monolith and a second washcoat coating disposed in a second washcoat zone of the substrate monolith, wherein the first washcoat coating comprises a catalyst composition comprising at least one platinum group metal (PGM) and at least one support material, wherein at least one PGM in the first washcoat coating is liable to volatilise when the first washcoat coating is exposed to relatively extreme conditions including relatively high temperatures, wherein the second washcoat coating comprises at least one material supporting copper for trapping volatilised PGM and optionally wherein the second washcoat coating is oriented to contact exhaust gas that has contacted the first washcoat. The invention further preferably relates to the use of the catalysed substrate monolith to reduce or prevent poisoning of a selective catalytic reduction (SCR) catalyst by a platinum group metal (PGM) and to oxidise carbon monoxide (CO) and/or hydrocarbons (HCs) in an exhaust gas of a lean-burn internal combustion engine.

BRIEF DESCRIPTION OF THE DRAWINGS

In order that the invention may be more fully understood, reference is made to the following Examples by way of illustration only and with reference to the accompanying drawings.

DETAILED DESCRIPTION OF THE INVENTION

Typically, the exhaust system according to the invention can comprise an injector for injecting a nitrogenous reductant into exhaust gas between the first catalysed substrate monolith and the second catalysed substrate monolith. Nitrogenous reductants and precursors thereof for use in the present invention include any of those mentioned hereinabove in connection with the background section. Thus, for example, the nitrogenous reductant is preferably ammonia or urea.

Alternatively, (i.e. without means for injecting ammonia or a precursor thereof such as urea being disposed between the first catalysed substrate monolith and the second catalysed substrate monolith), or in addition to the means for injecting ammonia or a precursor thereof, engine management means is preferably provided for enriching exhaust gas such that ammonia gas is generated in situ by reduction of NO on the catalyst composition of the first washcoat coating and/or a DOC or NAC, typically a substrate monolith comprising a DOC composition or NAC composition, disposed upstream of the first substrate monolith or downstream of the first substrate monolith. Where the substrate monolith comprises a DOC composition or NAC composition or the NAC is disposed downstream of the filter, preferably it is disposed upstream of the means for injecting ammonia or a precursor thereof or between the first and the second catalysed substrate monoliths.

In combination with an appropriately designed and managed diesel compression ignition engine (upstream of substrate monolith, not shown), enriched exhaust gas, i.e. exhaust gas containing increased quantities of carbon monoxide and hydrocarbon relative to normal lean running mode, contacts the NAC. Components within a NAC or NAC composition such as PGM-promoted ceria or ceria-zirconia can promote the water-gas shift reaction, i.e. $CO_{(g)}+H_2O_{(v)} \rightarrow CO_{2(g)}+H_{2(g)}$ evolving $H_2$. From the side reaction footnote to reactions (3) and (4) set out hereinabove, e.g. $Ba(NO_3)_2+8H_2 \rightarrow BaO+2NH_3+5H_2O$, $NH_3$ can be generated in situ and stored for NO reduction on the downstream SCR catalyst.

Nitrogenous reductants and precursors thereof for use in the present invention include any of those mentioned hereinabove in connection with the background section. Thus, for example, the nitrogenous reductant is preferably ammonia or urea.

In general, the first washcoat coating comprises platinum. When at least one PGM in the first washcoat coating is platinum, then the platinum is the PGM liable to volatilise when the first washcoat coating is exposed to relatively extreme conditions including relatively high temperatures. The relatively extreme conditions including relatively high temperatures are, for example, temperatures of >700° C., preferably >800° C., or more preferably >900° C.

Typically, the first washcoat coating comprises both platinum and palladium (i.e. the at least one PGM is both platinum and palladium). The platinum and/or the palladium can be the PGM liable to volatilise when the first washcoat coating is exposed to relatively extreme conditions including relatively high temperatures. However, when both platinum and palladium are present, then normally platinum is more likely to be the PGM liable to volatilise when the first washcoat coating is exposed to relatively extreme conditions including relatively high temperatures.

In an embodiment of the invention, the first washcoat coating does not comprise gold, especially a palladium-gold alloy.

Since the first catalysed substrate monolith comprises a measure to reduce or prevent volatilised platinum from migrating from the catalyst comprising platinum to a downstream SCR catalyst, it is possible for relatively high Pt:Pd weight ratios to be used in the catalyst comprising platinum for the purposes of, e.g. generating $NO_2$ to promote downstream combustion of filtered particulate matter, such as ≤10:1, e.g. 8:1, 6:1, 5:1 or 4:1. It is possible to use such relatively high Pt:Pd weight ratios, even though PGM may volatilise therefrom because the design of the first catalysed substrate monolith of the invention substantially prevents volatilised PGM from contacting the downstream SCR catalyst.

However, the present inventors have found that by reducing the Pt:Pd weight ratio it is possible to further reduce the level of PGM volatilisation, which can reduce or prevent PGM poisoning of the downstream SCR catalyst. Where the at least one PGM in the first washcoat coating comprises both platinum and palladium, preferably the weight ratio of Pt:Pd is ≤2, such as ≤1.5:1, e.g. about 1:1. The significance of this feature is shown in the Examples: the inventors have found that the preferred Pt:Pd weight ratios volatilise less by empiric testing than a similar catalyst having a Pt:Pd weight ratio of 4:1. In layered catalyst arrangements, it is preferred that an outer layer has a Pt:Pd weight ratio of ≤2, or optionally that the overall Pt:Pd weight ratio of all layers combined is ≤2.

Typically, the weight ratio of Pt:Pd is ≥35:65 (e.g. ≥7:13). It is preferred that the weight ratio Pt:Pd is ≥40:60 (e.g. ≥2:3), more preferably ≥42.5:57.5 (e.g. ≥17:23), particularly ≥45:55 (e.g. ≥9:11), such as ≥50:50 (e.g. ≥1:1), and still more preferably ≥1.25:1. The weight ratio of Pt:Pd is typically 10:1 to 7:13. It is preferred that the weight ratio of Pt:Pd is 8:1 to 2:3, more preferably 6:1 to 17:23, even more preferably 5:1 to 9:11, such as 4:1 to 1:1, and still more preferably 2:1 to 1.25:1.

Generally, the total amount of the platinum group metal (PGM) (e.g. the total amount of Pt and/or Pd) is 1 to 500 g ft$^{-3}$. Preferably, the total amount of the PGM is 5 to 400 g ft$^{-3}$, more preferably 10 to 300 g ft$^{-3}$, still more preferably, 25 to 250 g ft$^{-3}$, and even more preferably 35 to 200 g ft$^{-3}$.

The support material in the first washcoat coating can be a metal oxide (i.e. at least one metal oxide), a molecular sieve (i.e. at least one molecular sieve) or a mixture of any two or more thereof. Preferably, the support material comprises at least one metal oxide. It is further preferred that the support material comprises at least one metal oxide, and that the first washcoat coating comprises at least one molecular sieve.

Generally, the at least one metal oxide support of the first washcoat coating may comprise a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof. Suitable stabilisers include one or more of silica and rare earth metals. The first washcoat coating preferably comprises optionally stabilised alumina or amorphous silica-alumina.

Typically, the support material in the second washcoat coating can be a metal oxide (i.e. at least one metal oxide), a molecular sieve (i.e. at least one molecular sieve) or a mixture of any two or more thereof. Thus, the at least one material supporting copper is copper supported on at least one support material, wherein the support material is as described herein.

The second washcoat coating may comprise a molecular sieve. It is appreciated that a molecular sieve supporting copper in the second washcoat coating may be formulated in such a way that it is active as a SCR catalyst for the reduction of oxides of nitrogen using a nitrogenous reductant. The combination of a copper/molecular sieve SCR catalyst and engine management means for enriching exhaust gas such that ammonia gas is generated in situ by reduction of $NO_x$ on the catalyst composition of the first washcoat is particularly preferred. In one embodiment, the second washcoat coating does not comprise a metal oxide, such as optionally stabilised alumina, amorphous silica-alumina, optionally stabilised zirconia, ceria, titania, an optionally stabilised ceria-zirconia mixed oxide and mixtures of any two or more thereof.

However, the at least one metal oxide support of the second washcoat coating typically comprises a metal oxide selected from the group consisting of optionally stabilised alumina, amorphous silica-alumina, optionally stabilised zirconia, ceria, titania, an optionally stabilised ceria-zirconia mixed oxide and mixtures of any two or more thereof. Suitable stabilisers include one or more of silica and rare earth metals.

When the second washcoat coating comprises a metal oxide, then preferably the metal oxide is selected from the group consisting of optionally stabilised alumina, amorphous silica-alumina, optionally stabilised zirconia, titania, an optionally stabilised ceria-zirconia mixed oxide and mixtures of any two or more thereof. More preferably, the metal oxide is optionally stabilised alumina.

In one embodiment, the second washcoat coating does not comprise ceria and/or a molecular sieve.

The second washcoat coating typically comprises copper in a total amount of from 10 to 350 g ft$^{-3}$. It is preferred that the total amount of copper in the second washcoat coating is 20 to 300 g ft$^{-3}$, more preferably 30 to 250 g ft$^{-3}$, still more preferably, 45 to 200 g ft$^{-3}$, and even more preferably 50 to 175 g ft$^{-3}$.

The first washcoat coating comprises a catalyst composition comprising at least one platinum group metal (PGM) and at least one support material for the at least one PGM. The catalyst is typically applied to the substrate monolith as a washcoat slurry comprising at least one PGM salt and one or more support materials in the finished catalyst coating, before the coated filter is dried and then calcined. The one or more support materials may be referred to as a "washcoat component". It is also possible for at least one PGM to be pre-fixed to one or more support materials prior to it being slurried, or for a combination of support material particles to which PGM is pre-fixed to be slurried in a solution of PGM salt.

By at least one "support material" herein, we mean a metal oxide selected from the group consisting of optionally stabilised alumina, amorphous silica-alumina, optionally stabilised zirconia, ceria, titania and an optionally stabilised ceria-zirconia mixed oxide or a molecular sieve and mixtures of any two or more thereof.

The at least one support material may include one or more molecular sieve, e.g. an aluminosilicate zeolite. The primary duty of the molecular sieve in the PGM catalyst for use in the present invention is for improving hydrocarbon conversion over a duty cycle by storing hydrocarbon following cold start or during cold phases of a duty cycle and releasing stored hydrocarbon at higher temperatures when associated platinum group metal catalyst components are more active for HC conversion. See for example Applicant/Assignee's EP 0830201. Molecular sieves are typically used in catalyst compositions according to the invention for light-duty diesel vehicles, whereas they are rarely used in catalyst compositions for heavy duty diesel applications because the exhaust gas temperatures in heavy duty diesel engines mean that hydrocarbon trapping functionality is generally not required.

However, molecular sieves such as aluminosilicate zeolites are not particularly good supports for platinum group metals because they are mainly silica, particularly relatively higher silica-to-alumina molecular sieves, which are favoured for their increased thermal durability: they may thermally degrade during ageing so that a structure of the molecular sieve may collapse and/or the PGM may sinter, giving lower dispersion and consequently lower HC and/or CO conversion activity.

When the first washcoat coating and/or the second washcoat coating each comprise a molecular sieve, then preferably the first washcoat coating and/or the second washcoat coating comprise a molecular sieve at ≤30% by weight (such as ≤25% by weight, ≤20% by weight e.g. ≤15% by weight) of the individual washcoat coating layer. The remaining at least one support material of the first washcoat coating or the second washcoat coating may comprise a metal oxide selected from the group consisting of optionally stabilised alumina, amorphous silica-alumina, optionally stabilised zirconia, ceria, titania and an optionally stabilised ceria-zirconia mixed oxide and mixtures of any two or more thereof.

Preferred molecular sieves for use as support materials/hydrocarbon adsorbers are medium pore zeolites, preferably aluminosilicate zeolites, i.e. those having a maximum ring size of eight tetrahedral atoms, and large pore zeolites (maximum of ten tetrahedral atoms) preferably aluminosilicate zeolites, include natural or synthetic zeolites such as faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite or a beta zeolite, preferably ZSM-5, beta and Y zeolites. Preferred zeolite adsorbent materials have a high silica to alumina ratio, for improved hydrothermal stability. The zeolite may have a silica/alumina molar ratio of from at least about 25/1, preferably at least about 50/1, with useful ranges of from about 25/1 to 1000/1, 50/1 to 500/1 as well as about 25/1 to 100/1, 25/1 to 300/1, from about 100/1 to 250/1.

Substrate monoliths for use in the present invention can be ceramic, such as cordierite, aluminium titanate, silicon carbide or the like; or metallic, made e.g. of thin metal foils of ferritic iron-chromium-aluminium alloys.

The first substrate monolith may be a flow-through substrate monolith or a filtering substrate monolith. The second washcoat coating is generally oriented to contact exhaust gas that has contacted the first washcoat. This is to allow the first washcoat coating to come into contact with the exhaust gas first. The exhaust gas and any volatilised PGM from the first washcoat coating is then contacted with the second washcoat coating that includes copper for trapping the volatilised PGM.

When the first substrate monolith is a flow-through substrate monolith, then typically either the first washcoat zone or the first washcoat coating is disposed at an inlet end of the substrate monolith and the second washcoat zone or the second washcoat coating is disposed at an outlet end of the substrate monolith. The first washcoat coating and second washcoat coating may overlap (e.g. at a middle section of the substrate monolith). When the first washcoat coating and the second washcoat coating overlap (e.g. one washcoat coating on top of the other), then preferably the second washcoat coating is disposed on top of the first washcoat coating (e.g. in the region of overlap), and the first washcoat coating is disposed on the substrate monolith (i.e. the first washcoat coating is in contact with a surface of the substrate monolith). It is preferred that there is substantially no overlap between the first washcoat coating and the second washcoat coating or the first washcoat zone and the second washcoat zone.

Typically, a filtering substrate monolith has inlet surfaces and outlet surfaces, wherein the inlet surfaces are separated from the outlet surfaces by a porous structure and wherein the first washcoat coating of the first zone is applied to the inlet surfaces and the second washcoat coating of the second zone is applied to the outlet surfaces. When the first substrate monolith is a filtering substrate monolith, then preferably the filtering substrate monolith is a wall-flow filter, such as described in the background section hereinabove, wherein inlet channels of the wall-flow filter comprise the first zone and wherein outlet channels of the wall-flow filter comprise the second zone.

Methods of making catalysed substrate monoliths, including single layer washcoat coatings and dual layered arrangements (one washcoat coating layer above another washcoat coating layer) are known in the art and include Applicant/Assignee's WO 99/47260, i.e. comprising the steps of (a) locating a containment means on top, first end of a substrate monolith, (b) dosing a pre-determined quantity of a first washcoat coating component into said containment means, either in the order (a) then (b) or (b) then (a), and (c) by applying pressure or vacuum, drawing said first washcoat coating component into at least a portion of the substrate monolith, and retaining substantially all of said quantity within the substrate monolith. In a first step a coating from a first end of application can be dried and the dried substrate monolith can be flipped through 180 degrees and the same procedure can be done to a top, second end of the substrate monolith, with substantially no overlap in layers between applications from the first and second ends of the substrate monolith. The resulting coating product is then dried, and then calcined. The process is repeated with a second washcoat coating component, to provide a catalysed (bi-layered) substrate monolith according to the invention.

The filtering substrate monolith for use in the invention is preferably a wall-flow filter, i.e. a ceramic porous filter substrate comprising a plurality of inlet channels arranged in parallel with a plurality of outlet channels, wherein each inlet channel and each outlet channel is defined in part by a ceramic wall of porous structure, wherein each inlet channel is alternatingly separated from an outlet channel by a ceramic wall of porous structure and vice versa. In other words, the wall-flow filter is a honeycomb arrangement defining a plurality of first channels plugged at an upstream end and a plurality of second channels not plugged at the upstream end but plugged at a downstream end. Channels vertically and laterally adjacent to a first channel are plugged at a downstream end. When viewed from either end, the alternately plugged and open ends of the channels take on the appearance of a chessboard.

Catalysed filters, preferably wall-flow filters, can be coated using the method disclosed in Applicant/Assignee's WO 2011/080525. That is, a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition may be coated on filter channels from a first end, following which the coated filter can be dried.

The second substrate monolith can be a flow-through substrate monolith or a filtering substrate monolith having inlet surfaces and outlet surfaces, wherein the inlet surfaces are separated from the outlet surfaces by a porous structure, preferably a wall-flow filter.

The first washcoat coating disposed in the first washcoat zone can comprise an oxidation catalyst or a $NO_x$ adsorber catalyst (i.e. an oxidation or NAC composition) as described in the background of the invention hereinabove. A NAC or an NAC composition contains significant quantities of alkaline earth metals and/or alkali metals relative to an oxidation catalyst. The NAC or NAC composition typically also includes ceria or a ceria-containing mixed oxide, e.g. a mixed oxide of cerium and zirconium, which mixed oxide optionally further including one or more additional lanthanide or rare earth elements. Where the first substrate monolith is a filtering substrate monolith and the first washcoat is an oxidation catalyst, this device is often referred to in the art as a "catalysed soot filter" or "CSF".

The second catalysed substrate monolith comprises a catalyst for selectively catalysing the reduction of oxides of nitrogen to dinitrogen with a nitrogenous reductant, also known as a selective catalytic reduction (SCR) catalyst.

Typically, the SCR catalyst is coated as a coating onto a substrate monolith, such as described hereinabove.

Alternatively, the SCR catalyst is provided as an extrudate (also known as a "catalyst body"), i.e. the catalyst is mixed with components of the substrate monolith structure, which are both extruded, so the catalyst is part of the walls of the substrate monolith.

The SCR catalyst of the second substrate monolith can comprise a filtering substrate monolith or a flow-through substrate monolith. It is also possible to make a wall-flow filter from an extruded SCR catalyst (see Applicant/Assignee's WO 2009/093071 and WO 2011/092521). Selective Catalytic Reduction (SCR) catalysts for use in connection with the second catalysed substrate monolith can be selected from the group consisting of at least one of Cu, Hf, La, Au, In, V, lanthanides and Group VIII transition metals, such as Fe, supported on a refractory oxide or molecular sieve. Suitable refractory oxides include $Al_2O_3$, $TiO_2$, $CeO_2$, $SiO_2$, $ZrO_2$ and mixed oxides containing two or more thereof. Non-zeolite catalyst can also include tungsten oxide, e.g. $V_2O_5/WO_3/TiO_2$. Preferred metals of particular interest are selected from the group consisting of Ce, Fe and Cu. Molecular sieves can be ion-exchanged with the above metals.

It is preferred that the at least one molecular sieve is an aluminosilicate zeolite or a SAPO. The at least one molecular sieve can be a small, a medium or a large pore molecular sieve, for example.

By "small pore molecular sieve" herein we mean a molecular sieves containing a maximum ring size of 8 tetrahedral atoms, such as CHA; by "medium pore molecular sieve" herein we mean a molecular sieve containing a maximum ring size of 10 tetrahedral atoms, such as ZSM-5; and by "large pore molecular sieve" herein we mean a molecular sieve having a maximum ring size of 12 tetrahedral atoms, such as beta. Small pore molecular sieves are potentially advantageous for use in SCR catalysts—see for example WO 2008/132452. Molecular sieves for use in SCR catalysts according to the invention include one or more metals incorporated into a framework of the molecular sieve e.g. Fe "in-framework" Beta and Cu "in-framework" CHA.

Particular molecular sieves with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1, with CHA molecular sieves, e.g. aluminosilicate CHA, currently preferred, particularly in combination with Cu as promoter, e.g. ion-exchanged.

It is preferred that an optionally catalysed filtering substrate monolith (i.e. a third catalysed substrate monolith) is disposed downstream from the second catalysed substrate, i.e. in the DOC/SCR/CSF arrangement discussed in connection with the background to the invention hereinabove. The filtering substrate monolith is preferably a wall-flow filter. Where catalysed, the catalyst for use in connection with the filtering substrate monolith is an oxidation catalyst, but in alternative embodiments it can be a NAC composition. Alternatively, the filtering substrate monolith can be uncatalysed.

Figure 5:
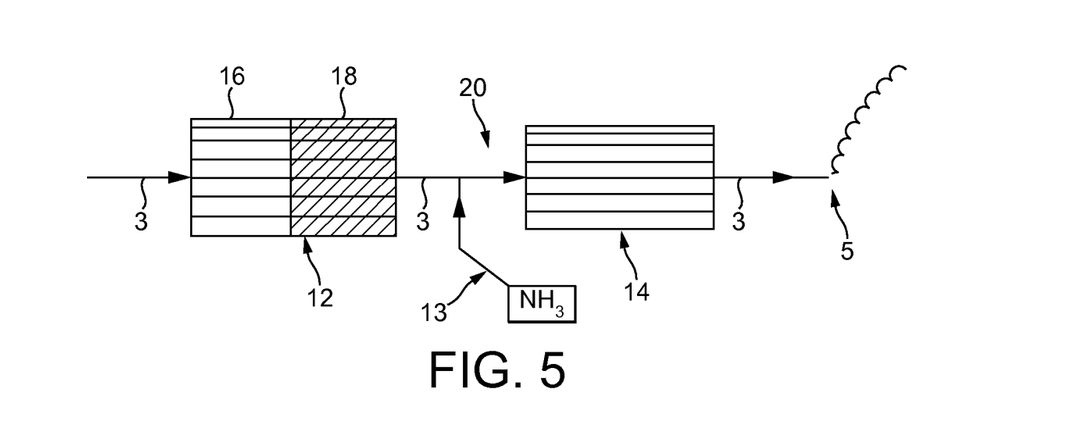
FIG. 5 is a schematic drawing of an exhaust system embodiment according to the invention.

An exhaust system according to the present invention is shown in FIG. 5. Exhaust system 20 comprises, in serial arrangement from upstream to downstream, a catalysed flow-through substrate monolith 12; a source of ammonia 13 comprising an injector for an ammonia precursor, urea; and a flow-through substrate monolith 14 coated with a Fe/Beta SCR catalyst. Each substrate monolith 12, 14 is disposed in a metal container or "can" including coned diffusers and they are linked by a series of conduits 3 of smaller cross sectional area than a cross sectional area of any of substrate monoliths 12, 14. The coned diffusers act to spread the flow of exhaust gas entering a housing of a "canned" substrate monolith so that the exhaust gas as a whole is directed across substantially the whole front "face" of each substrate monolith. Exhaust gas exiting substrate monolith 4 is emitted to atmosphere at "tail pipe" 5.

Catalysed flow-through substrate monolith 12 comprises a first zone 16 defined in part by an upstream end thereof coated with a 4:1 Pt:Pd weight ratio catalyst wherein the Pt and Pd are supported on a support material; and a second zone 18 of about 50% of a total length of the flow-through substrate monolith with substantially no overlap with first zone 16, which second zone 18 comprising a copper compound supported on a stabilised particulate alumina support material. The catalysed flow-through substrate monolith is designed for the purpose of promoting reaction (1) and thereby reaction (6) on the downstream SCR catalyst.

EXAMPLES

Example 1

Preparation of Substrate Monolith Coated with 5 wt % Fe/Beta Zeolite

Commercially available Beta zeolite was added to an aqueous solution of $Fe(NO_3)_3$ with stirring. After mixing, binders and rheology modifiers were added to form a washcoat composition.

A 400 cells per square inch cordierite flow-through substrate monolith was coated with an aqueous slurry of the 5 wt % Fe/Beta zeolite sample using the method disclosed in WO 99/47260, i.e. comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. This coated product (coated from one end only) is dried and then calcined and this process is repeated from the other end so that substantially the entire substrate monolith is coated, with a minor overlap in the axial direction at the join between the two coatings. A core of 1 inch (2.54 cm) diameter×3 inches long was cut from the finished article.

Comparative Example 2

Preparation of Pt-only Catalysed Wall-Flow Filter

A washcoat composition comprising a mixture of alumina particles milled to a relatively high particle size distribution, platinum nitrate, binders and rheology modifiers in deionised water was prepared. An aluminium titanate wall-flow filter was coated with the catalyst composition at a washcoat loading of 0.2 g/in$^3$ to a final total Pt loading of 5 g/ft$^{-3}$ using the method and apparatus disclosed in the Applicant/Assignee's WO 2011/080525, wherein channels at a first end intended for orientation to an upstream side were coated for 75% of their total length with a washcoat comprising platinum nitrate and particulate alumina from the intended upstream end thereof; and channels at an opposite end and intended to be oriented to a downstream side are coated for 25% of their total length with the same washcoat as the inlet channels. That is, the method comprised the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate. The catalyst composition was coated on filter channels from a first end, following which the coated filter was dried. The dried filter coated from the first end was then turned and the method was repeated to coat the same catalyst to filter channels from the second end, followed by drying and calcining.

A core of 1 inch (2.54 cm) diameter×3 inches (7.62 cm) long was cut from the finished article. The resulting part is described as "fresh", i.e. unaged.

Example 3

Preparation of Pt-Inlet/Cu—Al$_2$O$_3$-Outlet Containing Catalysed Wall-Flow Filter A coated filter was prepared using the same method as Comparative Example 2, except in that 100% of the total channel length of channels intended for orientation towards the inlet side of gas contact was coated with a washcoat containing platinum nitrate and alumina before the coated filter was dried; and 35% of the total length of channels intended for orientation towards the outlet side were coated with a washcoat containing alumina and copper sulphate. The resulting coated filter was then dried, and then calcined. The total loading of Pt on inlet channels of the coated filter was 5 gft$^{-3}$. The total copper loading on the outlet was 66 gft$^{-3}$.

A core of 1 inch (2.54cm) diameter×3 inches long was cut from the finished article. The resulting part is described as "fresh", i.e. unaged.

Example 4

Preparation of 1:1 weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft$^3$ Pt, 5 g/ft$^3$ Pd loading on both the inlet surfaces and the outlet surfaces, i.e. a total PGM loading of 10 g/ft$^3$.

A core of 1 inch (2.54 cm) diameter×3 inches long was cut from the finished article. The resulting part is described as "fresh", i.e. unaged.

Example 5

Preparation of 5:1 weight % Pt:Pd Containing Catalysed Wall-Flow Filter

A coated filter was prepared using the same method as in Comparative Example 2, except in that the washcoat applied to both the inlet channels and the outlet channels of the filter included palladium nitrate in addition to the platinum nitrate. The washcoat loading in the inlet and outlet channels was conducted in such a way as to arrive at a 5 g/ft$^3$ Pt, 1 g/ft$^3$ Pd loading on both the inlet surfaces and the outlet surfaces, i.e. a total PGM loading of 6 g/ft$^3$.

A core of 1 inch (2.54 cm) diameter×3 inches long was cut from the finished article. The resulting part is described as "fresh", i.e. unaged.

Example 6

System Tests

Figure 1:
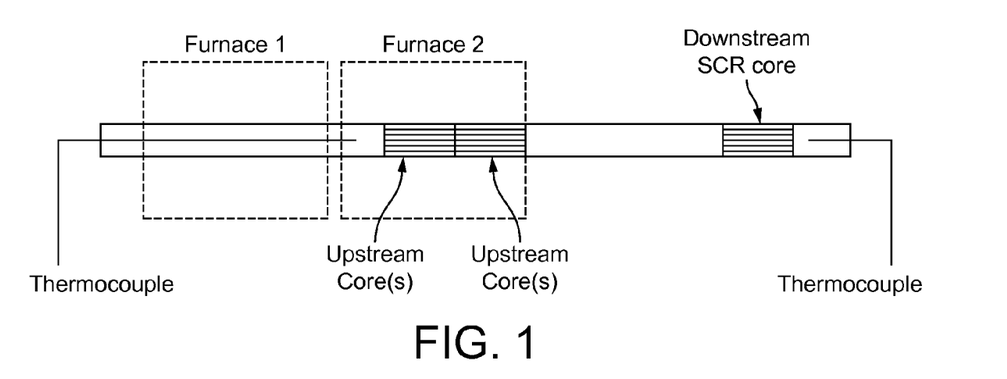
FIG. 1 is a schematic drawing of a laboratory reactor used for testing platinum contamination on an Fe/Beta zeolite SCR catalyst or a Cu/CHA zeolite SCR catalyst.

The tests were performed on a first synthetic catalyst activity test (SCAT) laboratory reactor illustrated in FIG. 1, in which a fresh core of the coated Fe/Beta zeolite SCR catalyst of Example 1 is disposed in a conduit downstream of a core of either the catalysed wall-flow filter of Comparative Example 2 or of Example 3, 4 or 5. A synthetic gas mixture was passed through the conduit at a catalyst swept volume of 30,000 hr$^{-1}$. A furnace was used to heat (or "age") the catalysed wall-flow filter sample at a steady-state temperature at a filter inlet temperature of 900° C. for 60 minutes, during which the inlet SCR catalyst temperature was 300° C. using. An air (heat exchanger) or water cooling mechanism was used to effect the temperature drop between the filter and the SCR catalyst. The gas mixture during the ageing was 10% O$_2$, 6% H$_2$O, 6% CO$_2$, 100 ppm CO, 400 ppm NO, 100 ppm HC as Cl, balance N$_2$.

Following ageing, the aged SCR catalysts were removed from the first SCAT reactor and inserted into a second SCAT reactor specifically to test NH$_3$-SCR activity of the aged samples. The aged SCR catalysts were then tested for SCR activity at 150, 200, 250, 300, 350, 450, 550 and 650° C. using a synthetic gas mixture (O$_2$=14%; H$_2$O=7%; CO$_2$=5%; NH$_3$=250 ppm; NO=250 ppm; NO$_2$=0 ppm; N$_2$=balance) and the resulting NO$_x$ conversion was plotted against temperature for each temperature data point in FIG. 2. This plot essentially measures competition between reaction (9) and reaction (5) and thus how much reaction (9) affects the NO conversion by consumption of the available NH$_3$ needed for the SCR reaction (reaction (5)).

Figure 2:
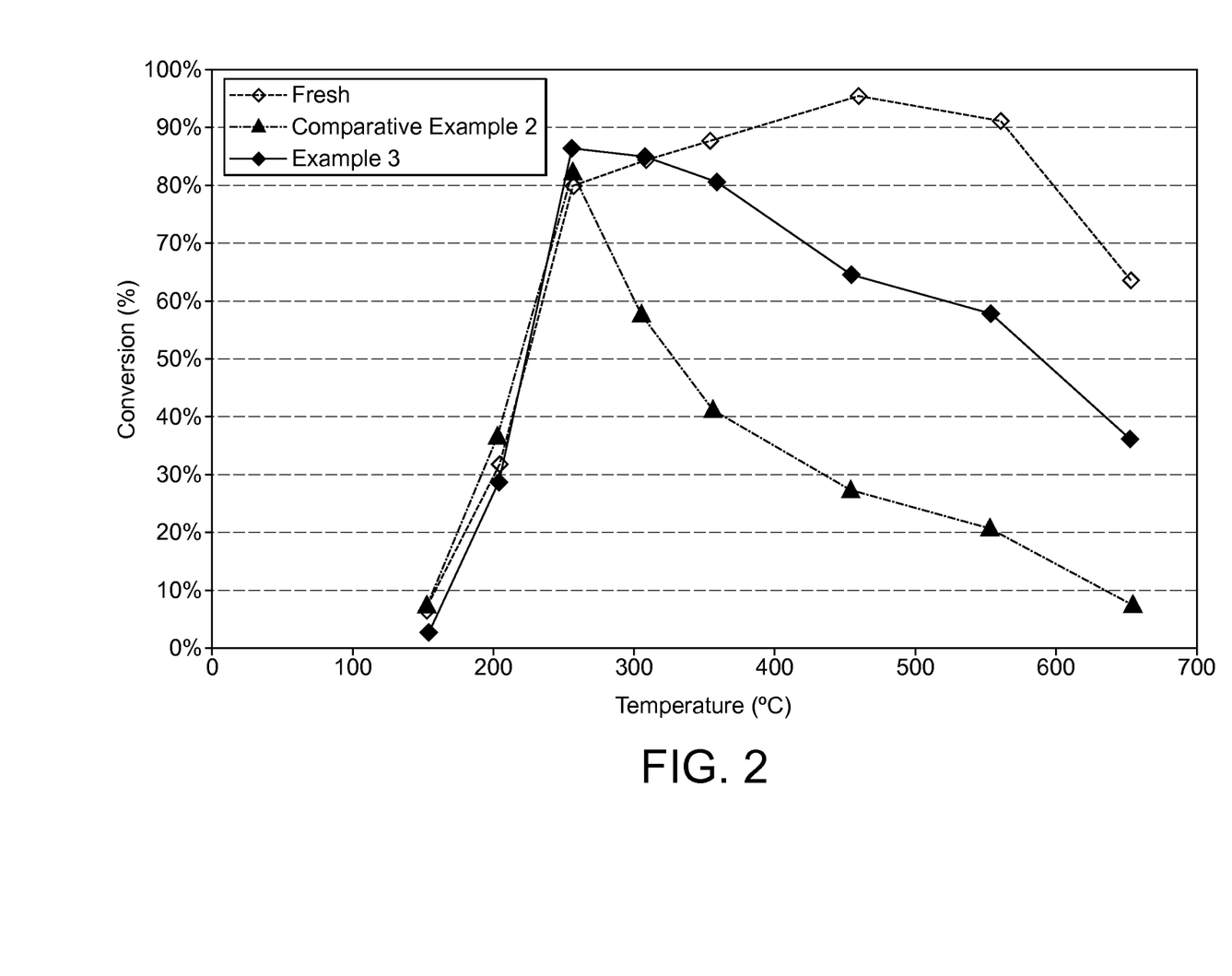
FIG. 2 is a graph comparing the NO conversion activity as a function of temperature of a two aged SCR catalyst cores each of which has been aged in a laboratory-scale exhaust system configuration containing core samples of Example 3 for use in the invention or Comparative Example 2. The results of the aged SCR activity are plotted against activity of a fresh, i.e. un-aged SCR catalyst.

The results are shown in FIG. 2. It can be seen from the results of testing Example 3 that the SCR catalyst in the exhaust system according to the present invention retains more activity than the SCR catalyst in Comparative Example 2, although it retains less SCR activity than a fresh catalyst. The inventors interpret this result as showing that the loss in SCR activity is caused in part by the deposition of low levels of Pt from the upstream catalysed wall-flow filter on the downstream SCR catalyst. Substantially no loss in activity was seen between a fresh Fe/Beta catalyst and a Fe/Beta catalyst aged at 300° C. for 1 hour without any catalyst present upstream (results not shown).

Example 7

Preparation of Substrate Monolith Coated with 3 wt % Cu/CHA Zeolite

Commercially available aluminosilicate CHA zeolite was added to an aqueous solution of $Cu(NO_3)_2$ with stirring. The slurry was filtered, then washed and dried. The procedure can be repeated to achieve a desired metal loading. The final product was calcined. After mixing, binders and rheology modifiers were added to form a washcoat composition.

A 400 cpsi cordierite flow-through substrate monolith was coated with an aqueous slurry of the 3 wt % Cu/CHA zeolite sample using the method disclosed in Applicant/Assignee's WO 99/47260 described in Example 1 hereinabove. The coated substrate monolith was aged in a furnace in air at 500° C. for 5 hours. A core of 1 inch (2.54 cm) diameter×3 inches long (7.62 cm) was cut from the finished article.

Example 8

Further Pt:Pd Weight Ratio Studies

Two diesel oxidation catalysts were prepared as follows:
Diesel Oxidation Catalyst A
A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the method of Example 1 hereinabove. The dosed part was dried and then calcined at 500° C. The total platinum group metal loading in the washcoat coating was 60 $gft^{-3}$ and the total Pt:Pd weight ratio was 4:1. A core of 1 inch (2.54 cm) diameter×3 inches (7.62 cm) long was cut from the finished article. The resulting part may be described as "fresh", i.e. unaged.
Diesel Oxidation Catalyst B
A single layered DOC was prepared as follows. Platinum nitrate and palladium nitrate were added to a slurry of silica-alumina. Beta zeolite was added to the slurry such that it comprised <30% of the solids content as zeolite by mass. The washcoat slurry was dosed onto a 400 cpsi flow-through substrate using the same method as used for DOC A. The dosed part was dried and then calcined at 500° C. The total PGM loading in the single layer DOC was 120 $g/ft^3$ and the Pt:Pd weight ratio was 2:1. A core of 1 inch (2.54 cm) diameter×3 inches (7.62 cm) long was cut from the finished article. The resulting part may be described as "fresh", i.e. unaged.

Both catalysts were tested according the protocols set out in Example 9. The results are set out in FIG. 3 with reference to a control (aged SCR catalyst that has not been further aged downstream of either DOC A or DOC B).

Example 9

System Tests

The tests were performed on a first synthetic catalyst activity test (SCAT) laboratory reactor illustrated in FIG. 1, in which an aged core of the coated Cu/CHA zeolite SCR catalyst of Example 7 was disposed in a conduit downstream of a core of either the Diesel Oxidation Catalyst (DOC) A or B (according to Example 8). A synthetic gas mixture was passed through the conduit at a rate of 6 liters per minute. A furnace was used to heat (or "age") the DOC samples at a steady-state temperature at a catalyst outlet temperature of 900° C. for 2 hours. The SCR catalyst was disposed downstream of the DOC sample and was held at a catalyst temperature of 300° C. during the ageing process by adjusting the length of tube between the furnace outlet and the SCR inlet, although a water cooled heat exchanger jacket could also be used as appropriate. Temperatures were determined using appropriately positioned thermocouples ($T_1$ and $T_2$). The gas mixture used during the ageing was 40% air, 50% $N_2$, 10% $H_2O$.

Following the DOC ageing, the SCR catalysts were removed from the first SCAT reactor and inserted into a second SCAT reactor specifically to test $NH_3$-SCR activity of the aged samples. The SCR catalysts were then tested for SCR activity at 500° C. using a synthetic gas mixture ($O_2$=10%; $H_2O$=5%; $CO_2$=7.5%; CO=330 ppm; $NH_3$=400 ppm; NO=500 ppm; $NO_2$=0 ppm; $N_2$=balance, i.e. an alpha value of 0.8 was used (ratio of $NH_3$:$NO_x$), so that the maximum possible NO conversion available was 80%) and the resulting NO conversion was plotted against temperature on the accompanying bar chart in FIG. 4. This plot essentially measures competition between reaction (9) and reaction (5) and thus how much reaction (9) affects the NO conversion by consumption of the available $NH_3$ needed for the SCR reaction (reaction (5)).

Pt:Pd weight Ratio Study—Conclusions

Figure 3:
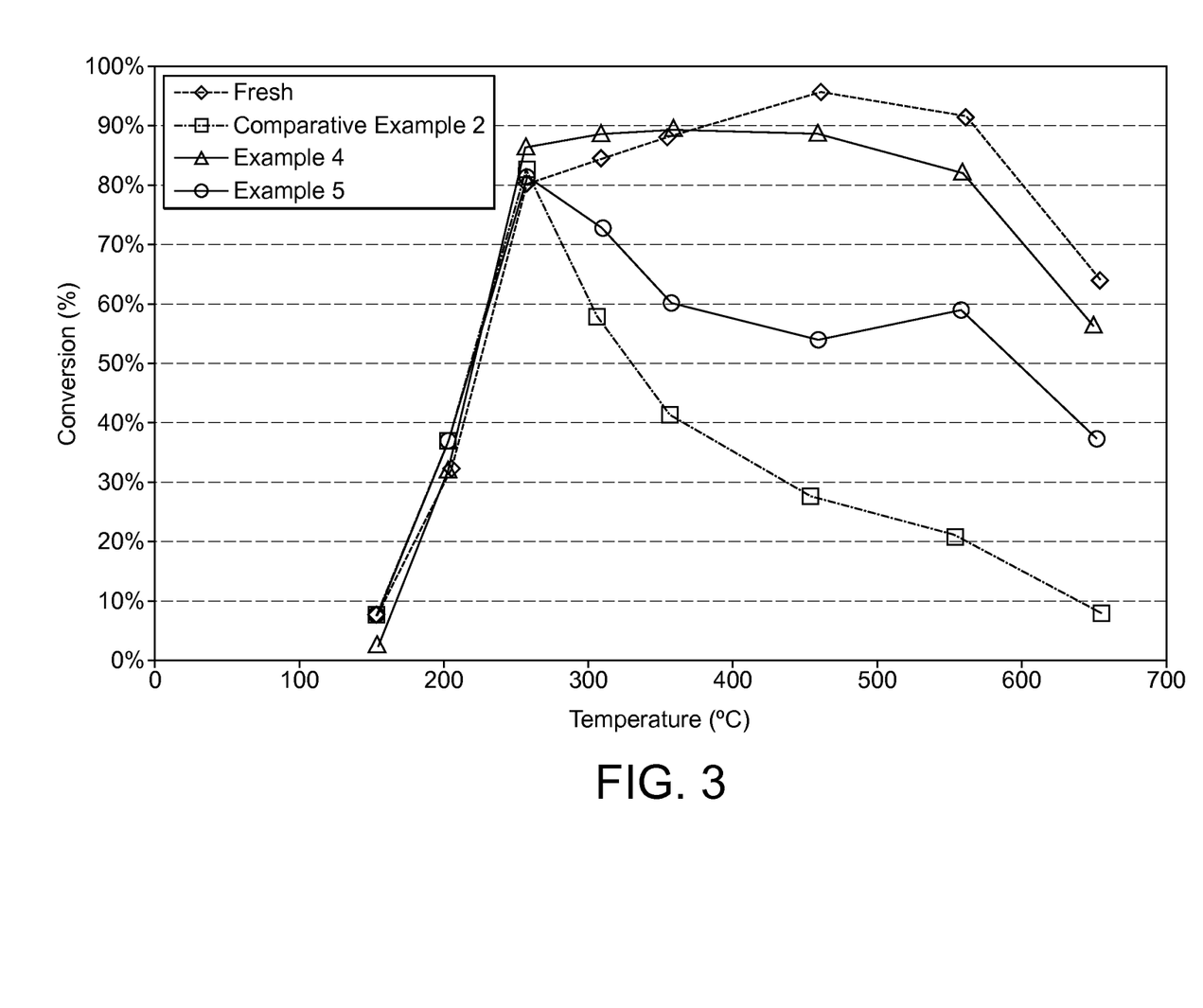
FIG. 3 is a graph comparing the NO conversion activity as a function of temperature of three aged SCR catalyst cores each of which has been aged in a laboratory-scale exhaust system configuration containing a catalysed wall-flow filter disposed upstream of the Fe/Beta zeolite SCR catalyst, one system comprising a filter coated on both inlet and outlet channels with Pt:Pd in a 1:1 weight ratio; a second system comprising a filter coated on both inlet and outlet channels with a Pt:Pd in a 5:1 weight ratio; and a third, comparative system comprising a filter coated on both inlet and outlet channels with a Pt-only catalyst. The results of the aged SCR activity are plotted against activity of a fresh, i.e. un-aged SCR catalyst.

Taken as a whole, the results of Example 6 shown in FIG. 3 in connection with Examples 4 and 5 and Comparative Example 2 indicate that a Pt:Pd weight ratio of between 1:1 and 5:1 is beneficial in reducing the problem of NO conversion activity loss through volatilisation of platinum group metal, principally platinum, from a platinum group metal containing catalyst to a downstream SCR catalyst.

Figure 4:
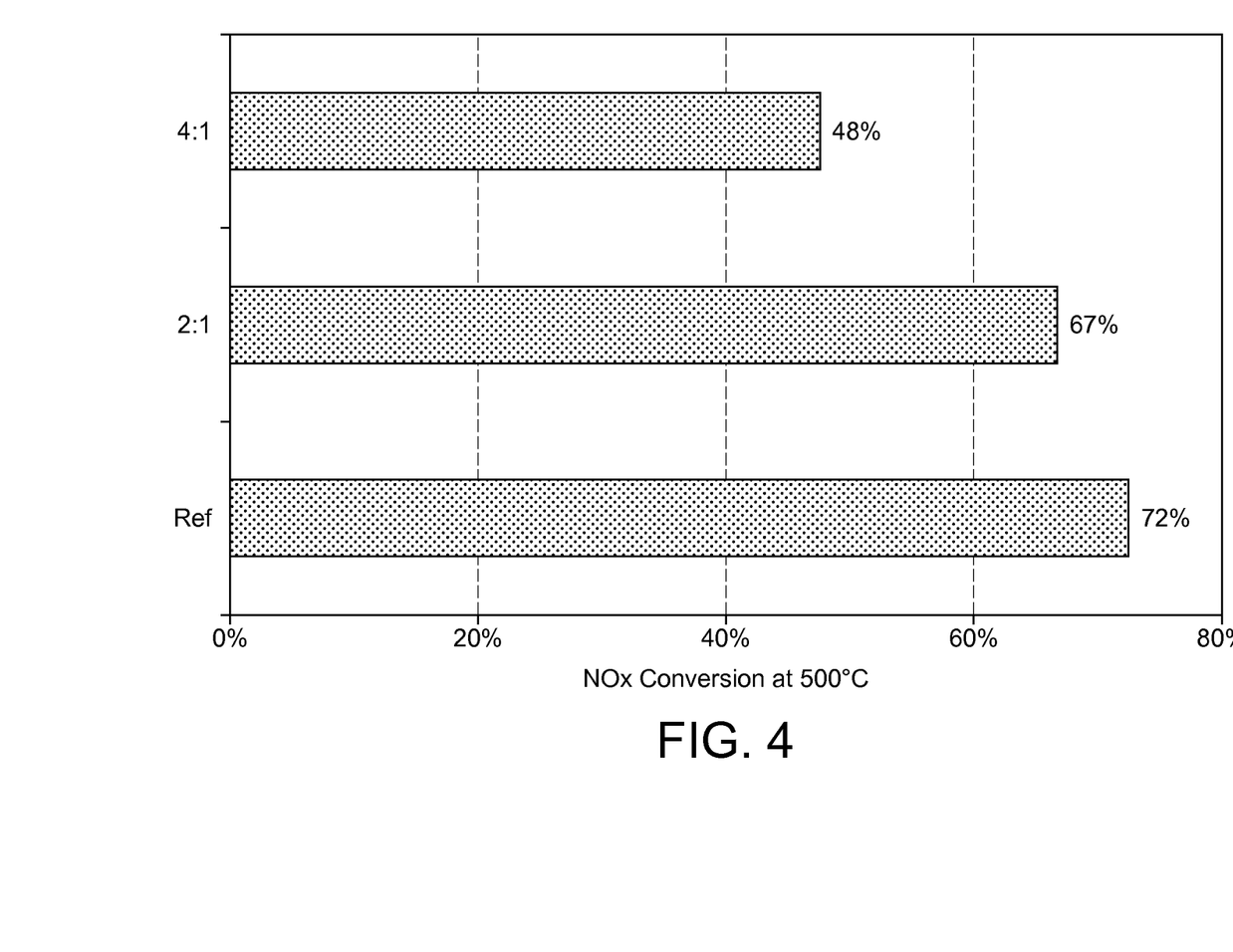
FIG. 4 is a bar chart comparing the NO conversion activity as a function of temperature of two aged SCR catalyst cores each of which has been aged in the laboratory-scale exhaust system shown in FIG. 1 containing core samples of the diesel oxidation catalyst of Example 8 heated in a tube furnace at 900° C. for 2 hours in a flowing synthetic exhaust gas with the Cu/CHA zeolite SCR catalyst core held at 300° C. located downstream.

The results of Example 9 shown in FIG. 4 in connection with Diesel Oxidation Catalysts A and B show that for a SCR catalyst aged downstream of a DOC having a 2:1 Pt:Pd weight ratio overall, the loss of NO conversion activity is relatively slight at 67% NO conversion activity compared with the control at 72% NO conversion activity (a SCR catalyst aged behind a 1:1 Pt:Pd weight ratio overall DOC (not described herein) using the same protocol had a NO conversion activity of 69%). However, when the overall Pt:Pd weight ratio was increased to 4:1, SCR activity was significantly reduced to 48%.

The inventors conclude, therefore, that there exists a boundary at about 2:1 Pt:Pd weight ratio overall above which Pt volatilisation is more likely to occur. Hence, by limiting to an overall Pt:Pd weight ratio of 2:1 in the DOC as a whole, and to ≤2:1 Pt:Pd weight ratio in the second washcoat coating layer, Pt in the DOC is less likely to volatilise and migrate to a downstream SCR catalyst.

For the avoidance of any doubt, the entire content of any and all documents cited herein is incorporated by reference into the present application.

The invention claimed is:
1. An exhaust system for an internal combustion engine, which system comprising:
a) a first catalysed substrate monolith comprising a first washcoat coating disposed in a first washcoat zone of the substrate monolith, wherein the first washcoat coating comprises a catalyst composition comprising at least one platinum group metal (PGM) and at least one support material, wherein at least one platinum group metal

(PGM) in the first washcoat coating is liable to volatilise when the first washcoat coating is exposed to a temperature of >700° C.; and a second washcoat coating disposed in a second washcoat zone of the substrate monolith, wherein the second washcoat coating comprises at least one support material supporting copper for trapping volatilised platinum group metal (PGM), wherein the at least one support material supporting copper is a molecular sieve, wherein the molecular sieve is an aluminosilicate zeolite, and wherein the second washcoat coating is oriented to contact exhaust gas that has contacted the first washcoat; and b) a second catalysed substrate monolith comprising a catalyst for selectively catalysing the reduction of oxides of nitrogen to dinitrogen with a nitrogenous reductant disposed downstream from the first catalysed substrate monolith.

2. An exhaust system according to claim 1, comprising an injector for injecting a nitrogenous reductant into exhaust gas between the first catalysed substrate monolith and the second catalysed substrate monolith.

3. An exhaust system according to claim 1, wherein the at least one PGM in the first washcoat coating comprises platinum.

4. An exhaust system according to claim 1, wherein the at least one platinum group metal (PGM) in the first washcoat coating comprises both platinum and palladium.

5. An exhaust system according to claim 4, wherein a weight ratio of Pt:Pd is ≤2.

6. An exhaust system according to claim 1, wherein the at least one support material of the first washcoat coating is at least one metal oxide, a molecular sieve or a mixture of any two or more thereof.

7. An exhaust system according to claim 6, wherein the at least one metal oxide support is selected from the group consisting of alumina, amorphous silica-alumina, zirconia, ceria, titania, a ceria-zirconia mixed oxide, stabilised alumina, stabilised zirconia, a stabilised ceria-zirconia mixed oxide and a mixture of any two or more thereof.

8. An exhaust system according to claim 6, wherein the molecular sieve is an aluminosilicate zeolite.

9. An exhaust system according to claim 1, wherein the first substrate monolith is a flow-through substrate monolith.

10. An exhaust system according to claim 1, wherein the first substrate monolith is a filtering substrate monolith having inlet surfaces and outlet surfaces, wherein the inlet surfaces are separated from the outlet surfaces by a porous structure and wherein the first washcoat coating of the first zone is applied to the inlet surfaces and the second washcoat coating of the second zone is applied to the outlet surfaces.

11. An exhaust system according to claim 10, wherein the filtering substrate monolith is a wall-flow filter, wherein inlet channels of the wall-flow filter comprise the first zone and wherein outlet channels of the wall-flow filter comprise the second zone.

12. An exhaust system according to claim 1, wherein the second substrate monolith is a flow-through substrate monolith.

13. An exhaust system according to claim 1, wherein the second substrate monolith is a filtering substrate monolith having inlet surfaces and outlet surfaces, wherein the inlet surfaces are separated from the outlet surfaces by a porous structure.

14. An exhaust system according to claim 13, wherein the filtering substrate monolith is a wall-flow filter.

15. An exhaust system according to claim 1, wherein the first washcoat comprises an oxidation catalyst or a $NO_x$ adsorber catalyst.

16. An exhaust system according to claim 1, comprising a third substrate monolith, wherein the third substrate monolith is a filtering substrate monolith, which third substrate monolith is disposed downstream of the second catalysed substrate monolith.

17. An exhaust system of claim 16, wherein the third substrate monolith comprises an oxidation catalyst.

18. An internal combustion engine for a vehicle comprising an exhaust system according to claim 1.

19. An exhaust system according to claim 1, wherein the molecular sieve is a medium pore zeolite having a maximum ring size of eight tetrahedral atoms or a large pore zeolite having a maximum of ring size of ten tetrahedral atoms.

20. An exhaust system according to claim 1, wherein the molecular sieve is a zeolite selected from faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite and a beta zeolite.

21. An exhaust system according to claim 1, wherein the molecular sieve is a zeolite having a silica/alumina molar ratio of from at least about 25/1.

22. An exhaust system according to claim 1, wherein the second washcoat coating comprises copper in a total amount of from 10 to 350 g $ft^{-3}$.

23. An exhaust system for an internal combustion engine, which system comprising:

a) a first catalysed substrate monolith comprising a first washcoat coating disposed in a first washcoat zone of the substrate monolith, wherein the first washcoat coating comprises a catalyst composition comprising at least one platinum group metal (PGM) and at least one support material, wherein at least one platinum group metal (PGM) in the first washcoat coating is liable to volatilise when the first washcoat coating is exposed to a temperature of >700° C.; and a second washcoat coating disposed in a second washcoat zone of the substrate monolith, wherein the second washcoat coating comprises at least one support material supporting copper for trapping volatilised platinum group metal (PGM), wherein the at least one support material supporting copper is a molecular sieve, wherein the molecular sieve is a medium pore zeolite having a maximum ring size of eight tetrahedral atoms or a large pore zeolite having a maximum of ring size of ten tetrahedral atoms, and wherein the second washcoat coating is oriented to contact exhaust gas that has contacted the first washcoat; and b) a second catalysed substrate monolith comprising a catalyst for selectively catalysing the reduction of oxides of nitrogen to dinitrogen with a nitrogenous reductant disposed downstream from the first catalysed substrate monolith.

24. An exhaust system according to claim 23, comprising an injector for injecting a nitrogenous reductant into exhaust gas between the first catalysed substrate monolith and the second catalysed substrate monolith.

25. An exhaust system according to claim 24, wherein the at least one PGM in the first washcoat coating comprises platinum.

26. An exhaust system according to claim 24, wherein the at least one platinum group metal (PGM) in the first washcoat coating comprises both platinum and palladium.

27. An exhaust system according to claim 26, wherein a weight ratio of Pt:Pd is ≤2.

28. An exhaust system according to claim 24, wherein the at least one support material of the first washcoat coating is at least one metal oxide, a molecular sieve or a mixture of any two or more thereof.

29. An exhaust system according to claim 28, wherein the at least one metal oxide support is selected from the group consisting of alumina, amorphous silica-alumina, zirconia, ceria, titania, a ceria-zirconia mixed oxide, stabilised alumina, stabilised zirconia, a stabilised ceria-zirconia mixed oxide and a mixture of any two or more thereof.

30. An exhaust system according to claim 28, wherein the molecular sieve is an aluminosilicate zeolite.

31. An exhaust system according to claim 24, wherein the first substrate monolith is a flow-through substrate monolith.

32. An exhaust system according to claim 24, wherein the first substrate monolith is a filtering substrate monolith having inlet surfaces and outlet surfaces, wherein the inlet surfaces are separated from the outlet surfaces by a porous structure and wherein the first washcoat coating of the first zone is applied to the inlet surfaces and the second washcoat coating of the second zone is applied to the outlet surfaces.

33. An exhaust system according to claim 32, wherein the filtering substrate monolith is a wall-flow filter, wherein inlet channels of the wall-flow filter comprise the first zone and wherein outlet channels of the wall-flow filter comprise the second zone.

34. An exhaust system according to claim 24, wherein the second substrate monolith is a flow-through substrate monolith.

35. An exhaust system according to claim 34, wherein the second substrate monolith is a filtering substrate monolith having inlet surfaces and outlet surfaces, wherein the inlet surfaces are separated from the outlet surfaces by a porous structure.

36. An exhaust system according to claim 35, wherein the filtering substrate monolith is a wall-flow filter.

37. An exhaust system according to claim 24, wherein the first washcoat comprises an oxidation catalyst or a $NO_x$ adsorber catalyst.

38. An exhaust system according to claim 24, comprising a third substrate monolith, wherein the third substrate monolith is a filtering substrate monolith, which third substrate monolith is disposed downstream of the second catalysed substrate monolith.

39. An exhaust system of claim 38, wherein the third substrate monolith comprises an oxidation catalyst.

40. An exhaust system according to claim 24, wherein the molecular sieve is a zeolite selected from faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite and a beta zeolite.

41. An exhaust system according to claim 24, wherein the molecular sieve is a zeolite having a silica/alumina molar ratio of from at least about 25/1.

42. An exhaust system for an internal combustion engine, which system comprising:
  a) a first catalysed substrate monolith comprising a first washcoat coating disposed in a first washcoat zone of the substrate monolith, wherein the first washcoat coating comprises a catalyst composition comprising at least one platinum group metal (PGM) and at least one support material, wherein at least one platinum group metal (PGM) in the first washcoat coating is liable to volatilise when the first washcoat coating is exposed to a temperature of >700° C.; and
    a second washcoat coating disposed in a second washcoat zone of the substrate monolith, wherein the second washcoat coating comprises at least one support material supporting copper for trapping volatilised platinum group metal (PGM), wherein the at least one support material supporting copper is a molecular sieve, wherein the molecular sieve is a zeolite having a silica/alumina molar ratio of from at least about 25/1, and wherein the second washcoat coating is oriented to contact exhaust gas that has contacted the first washcoat; and
  b) a second catalysed substrate monolith comprising a catalyst for selectively catalysing the reduction of oxides of nitrogen to dinitrogen with a nitrogenous reductant disposed downstream from the first catalysed substrate monolith.

43. An exhaust system according to claim 42, wherein the at least one PGM in the first washcoat coating comprises platinum.

44. An exhaust system for an internal combustion engine, which system comprising:
  a) a first catalysed substrate monolith comprising a first washcoat coating disposed in a first washcoat zone of the substrate monolith, wherein the first washcoat coating comprises a catalyst composition comprising at least one platinum group metal (PGM) and at least one support material, wherein at least one platinum group metal (PGM) in the first washcoat coating is liable to volatilise when the first washcoat coating is exposed to a temperature of >700° C.; and
    a second washcoat coating disposed in a second washcoat zone of the substrate monolith, wherein the second washcoat coating comprises at least one support material supporting copper for trapping volatilised platinum group metal (PGM), wherein the at least one support material supporting copper is a molecular sieve, wherein the molecular sieve is a zeolite selected from faujasite, clinoptilolite, mordenite, silicalite, ferrierite, zeolite X, zeolite Y, ultrastable zeolite Y, ZSM-5 zeolite, ZSM-12 zeolite, SSZ-3 zeolite, SAPO-5 zeolite, offretite and a beta zeolite, and wherein the second washcoat coating is oriented to contact exhaust gas that has contacted the first washcoat; and
  b) a second catalysed substrate monolith comprising a catalyst for selectively catalysing the reduction of oxides of nitrogen to dinitrogen with a nitrogenous reductant disposed downstream from the first catalysed substrate monolith.

45. An exhaust system according to claim 44, wherein the at least one PGM in the first washcoat coating comprises platinum.

* * * * *